(12) United States Patent
Milionta et al.

(10) Patent No.: US 6,715,594 B2
(45) Date of Patent: Apr. 6, 2004

(54) PORTABLE CARRYING CASE WITH DETACHABLE INSERTS

(76) Inventors: Lynn A. Milionta, 1018 Allendale Ct., Blacksburg, VA (US) 24060; Connie Linn Milionta, 1018 Allendale Ct., Blacksburg, VA (US) 24060

( * ) Notice: Subject to any disclaimer, the term of this patent is extended or adjusted under 35 U.S.C. 154(b) by 0 days.

(21) Appl. No.: 10/218,494

(22) Filed: Aug. 16, 2002

(65) Prior Publication Data

US 2004/0031655 A1 Feb. 19, 2004

(51) Int. Cl.[7] .............................. A45C 5/12; A45C 13/02
(52) U.S. Cl. ........................ 190/110; 190/108; 190/901; 150/111; 150/113; 383/117
(58) Field of Search .................. 150/111–113; 190/102, 190/108, 110, 901; 383/117, 39; 206/581

(56) References Cited

U.S. PATENT DOCUMENTS

| | | | | |
|---|---|---|---|---|
| 4,069,955 A | * | 1/1978 | Noyes | 224/604 |
| 4,263,951 A | * | 4/1981 | Siegel | 150/111 |
| 4,296,945 A | | 10/1981 | Pavlik | |
| 4,350,194 A | * | 9/1982 | Brown | 206/315.5 |
| 4,386,642 A | * | 6/1983 | Durbin | 190/110 |
| 4,566,130 A | | 1/1986 | Coates | |
| 4,720,012 A | * | 1/1988 | Dufour | 206/472 |
| 4,848,562 A | | 7/1989 | Liu | |
| 5,096,030 A | * | 3/1992 | Espinosa et al. | 190/108 |
| 5,207,303 A | * | 5/1993 | Oswalt et al. | 190/108 |
| 5,865,314 A | | 2/1999 | Jacober | |
| 6,012,557 A | * | 1/2000 | Derelanko | 190/108 |
| 6,095,213 A | * | 8/2000 | Roegner | 150/106 |
| 6,193,118 B1 | | 2/2001 | Kearl | |
| 6,296,094 B1 | * | 10/2001 | Knecht | 190/107 |

FOREIGN PATENT DOCUMENTS

| | | | | |
|---|---|---|---|---|
| GB | 2061712 A | | 5/1981 | |
| WO | WO9321793 | * | 11/1993 | 190/110 |

OTHER PUBLICATIONS

U. S. Patent application Publication No. 2002/0014539 A1 to Strevey et al. published 8/2002.*

* cited by examiner

*Primary Examiner*—Sue A. Weaver
(74) *Attorney, Agent, or Firm*—Richard C. Litman (57) ABSTRACT

A portable carrying case made of a fabric and having two panels connected by a fold is provided including an arrangement of several strips of hook-fastener material to which various inserts can be attached using corresponding strips of loop-fastener material. One of the panel surfaces has a mesh material layer permanently attached to it to hold elongated objects. The inserts can include single and multi-pocket pouches and a single sheet having fleece on one side, each of which has a strip of loop-fastener material used to fasten to corresponding hook-fastener strips inside the case. The case can be closed with pair of hook-and-loop fastener strips or by a zipper that can enclose three sides of the case. An additional external pouch can be attached onto the outside of the case using a pair of ribbons that are part of the external pouch.

7 Claims, 12 Drawing Sheets

PORTABLE CARRYING CASE WITH DETACHABLE INSERTS

BACKGROUND OF THE INVENTION

1. Field of the Invention

The present invention relates to portable carrying cases for sewing and knitting materials, fishing paraphernalia, and the like. More particularly, the inventive carrying case includes removable and interchangeable object-holding pockets, inserts, and pouches, which are held in place by strips of hook and loop fastener material.

2. Description of the Related Art

The use of foldable, portable cases for carrying small items is well known. However, none have the combination of removable, detachable pockets and inserts using hook-and-loop fastener strips as well as a mesh area on one of the internal surfaces of the case for holding elongated objects. Moreover, none teach the particular multi-pocket structure used as a removable insert.

U.S. Pat. No. 4,296,945, issued to Pavlik on Oct. 27, 1981, teaches a foldable pocket secretary having removable internal members, e.g., a removable notebook. The closure flap uses hook-and-loop fastener material.

U.S. Pat. No. 4,566,130, issued to Coates on Jan. 21, 1986, teaches a combination carrying bag for carrying diapers and infant accessories. Hook-and-loop fastener material is used to secure removable pockets inside the bag.

U.S. Pat. No. 4,848,562, issued to Liu on Jul. 18, 1989, teaches a pin collector bag having several pockets for holding small items.

U.S. Pat. No. 5,865,314, issued to Jacober on Feb. 2, 1999, teaches a case for carrying medical supplies which includes an outer zipper.

U.S. Pat. No. 6,193,118, issued to Kearl on Feb. 27, 2001, teaches an organizer including various pockets to hold different sizes and amounts of small objects.

UK Patent No. 2,061,712, published on May 20, 1981, teaches a carrying bag including an outer zipper and several internal pockets, one of the internal layers being held in place using a hook-and-loop fastener material.

None of the above inventions and patents, taken either singularly or in combination, is seen to describe the instant invention as claimed. Thus a portable carrying case solving the aforementioned problems is desired.

SUMMARY OF THE INVENTION

The portable carrying case includes at least two main panels having one or more hook-and-loop fastener strips permanently secured to the inside surfaces of the panels. Detachable and replaceable inserts of various types are provided to permit the user to choose the optimum types for use in their particular application, e.g., for a set of sewing or knitting needles and related small items used for sewing, or for carrying fishing tackle items such as lures, weights, etc.

More particularly, one of the inside surfaces of the case is provided with a mesh material, e.g., netting, to hold elongated objects.

The case is portable and is folded for closure. The case can be secured in the closed position by hook-and-loop fastener strips or by a zipper. Also, the case can be various sizes to accommodate various sized objects.

Accordingly, it is a principal object of the invention to provide a portable carrying case that can be folded and can hold various types and sizes of small objects, including small items and elongated items, and in which one of the inside surfaces includes a mesh layer for holding long items.

It is another object of the invention to provide a portable carrying case having pocket inserts which are detachably mounted using hook-and-loop fastener strips.

It is a further object of the invention to provide a portable carrying case which is made of textile material.

Still another object of the invention is to provide a portable carrying case having various detachable inserts which include single and multi-pocket pouches and a fleece insert.

Still another object of the invention is to provide a multi-pocket insert pouch for a carrying case which is removably attached to the case by hook-and-loop fastening strips.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a portable carrying case having various detachable, replaceable inserts.

Figure 1:
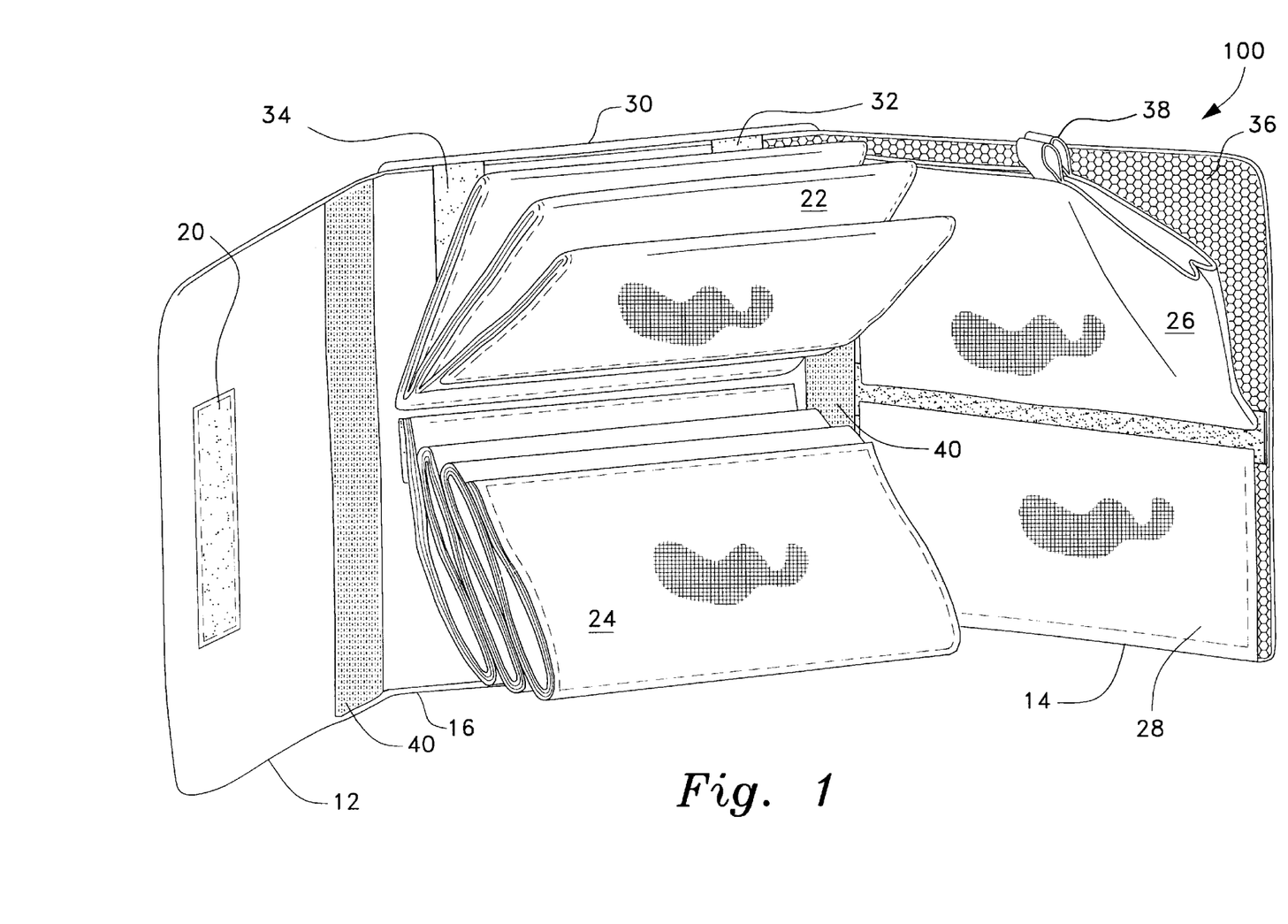
FIG. 1 is an environmental, perspective view of a portable small-article carrying case according to the present invention.

As shown in FIG. 1, carrying case 100 has two main panels 14 and 16, in which panel 14 can be folded into parallel relationship with panel 16. Flap 12 is used to close the case using hook-fastener strip 20 that attaches to a corresponding loop-fastener strip on the outside of panel 14. Two spines are used to form hinges 40, one spine being disposed between panel 14 and panel 16, and the other spine being disposed between panel 16 and flap 12. The inside surface of panel 14 of the case 100 is provided with a mesh material, e.g., netting 36, to hold elongated objects, such as knitting needles.

Figure 2:
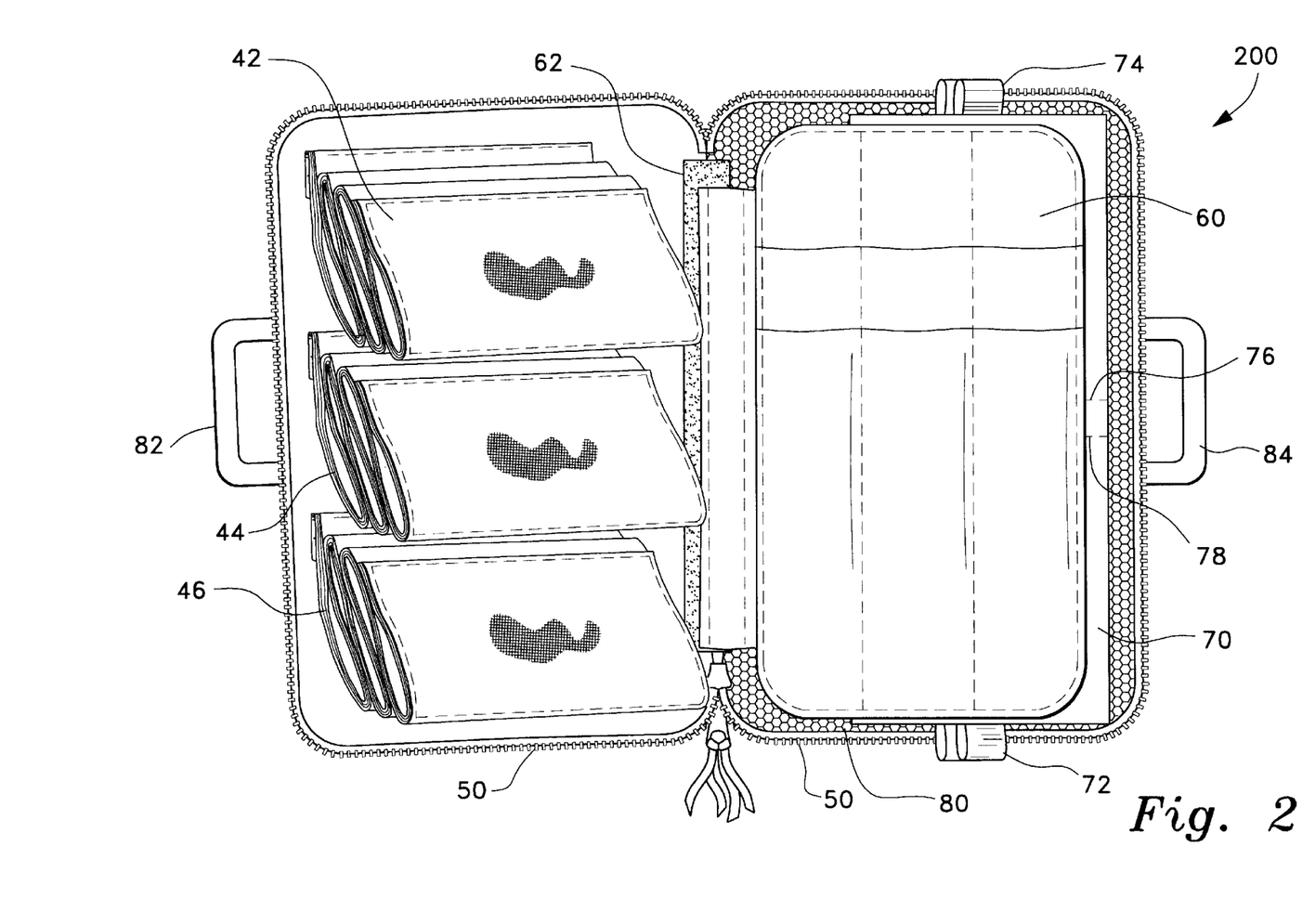
FIG. 2 is an environmental, perspective view of a second embodiment of a small-article carrying case according to the present invention.

An alternative embodiment of the carrying case, designated as 200, is shown in FIG. 2. In this embodiment, the carrying case is formed by panels 212 and 214 and is somewhat larger than that shown in FIG. 1, in order to hold larger objects, such as longer sewing needles. Panels 212 and 214 fold about a spine 62 and are secured in a closed position by zipper 50, which extends about three sides of the perimeter of case 200. Elongated multi-pocket insert 60 provides nine individual elongated pockets for holding long needles and is removably attached to hook-fastener strip 62. Multi-pocket inserts 42, 44 and 46 are likewise attached to their corresponding hook-fastener strips using corresponding loop-fastener strips located along their edges. The embodiment of FIG. 2 will be discussed in more detail later.

In the version shown in FIG. 1, the case 100 includes four inserts: multi-pocket pouch inserts, 22 and 24, single pocket insert 26 and single-ply insert 28. Single-ply insert 28 has a fleece backing for holding darning needles, pins, and other articles which may be hooked into the fleece. All four inserts are removably attached to the inside of the case 100 using a loop-fastener strip that fastens to a corresponding hook-fastener strip inside the case. An external pocket or pouch 30 is attached to the case 100 using ribbons 32 and 34 that wrap around panel 16 of the case 100. The opening of the single pocket insert 26 is closed using corresponding strips of hook- and loop-fastener material. The two ribbon loops 38 are used to grip and thereby open the insert 26 to place small objects inside.

Figure 3A:
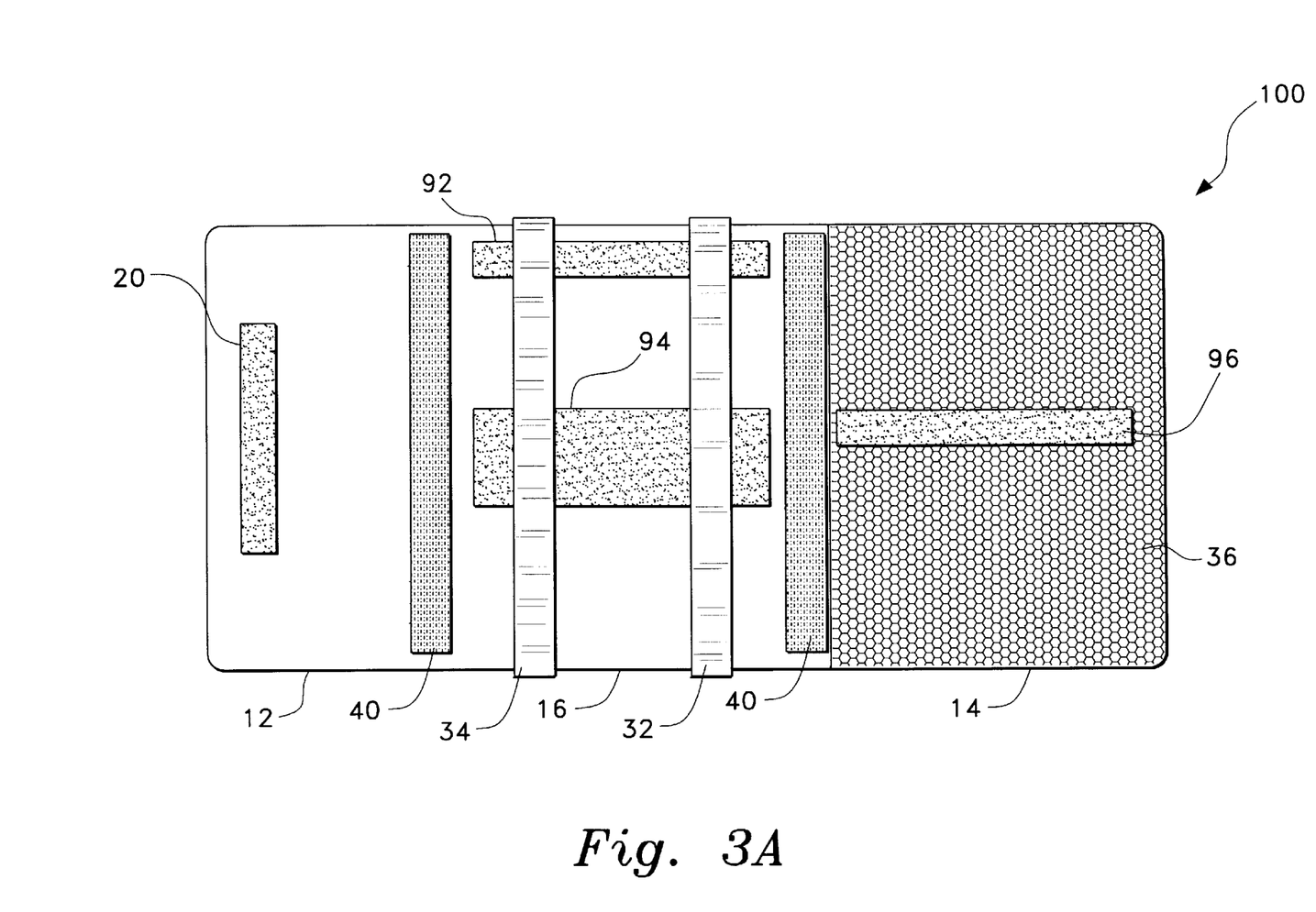
FIG. 3A shows the portable case of FIG. 1 unfolded and with all inserts removed.
Figure 3B:
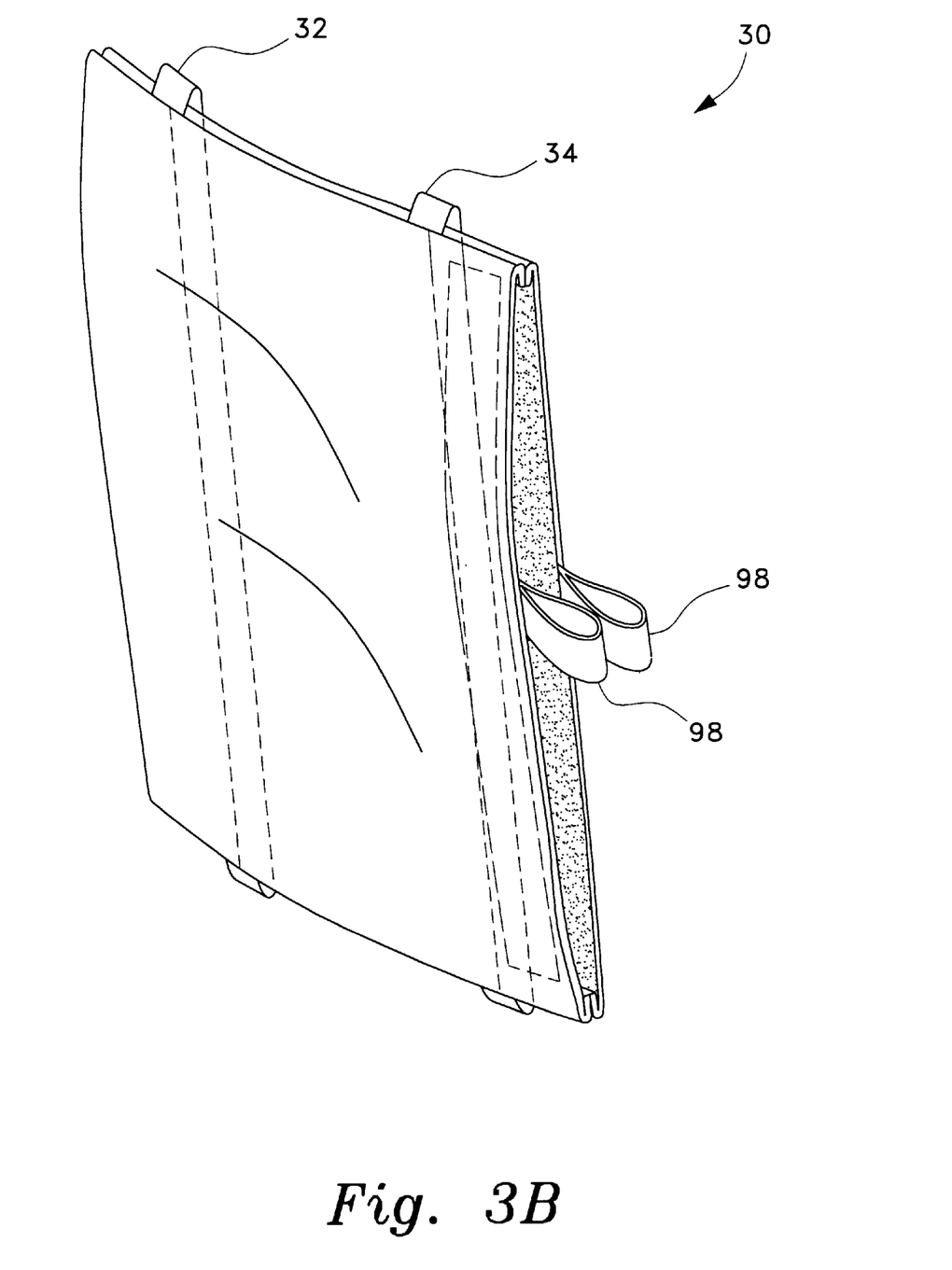
FIG. 3B shows a front view of an external pouch for the portable case of FIG. 1.
Figure 3C:
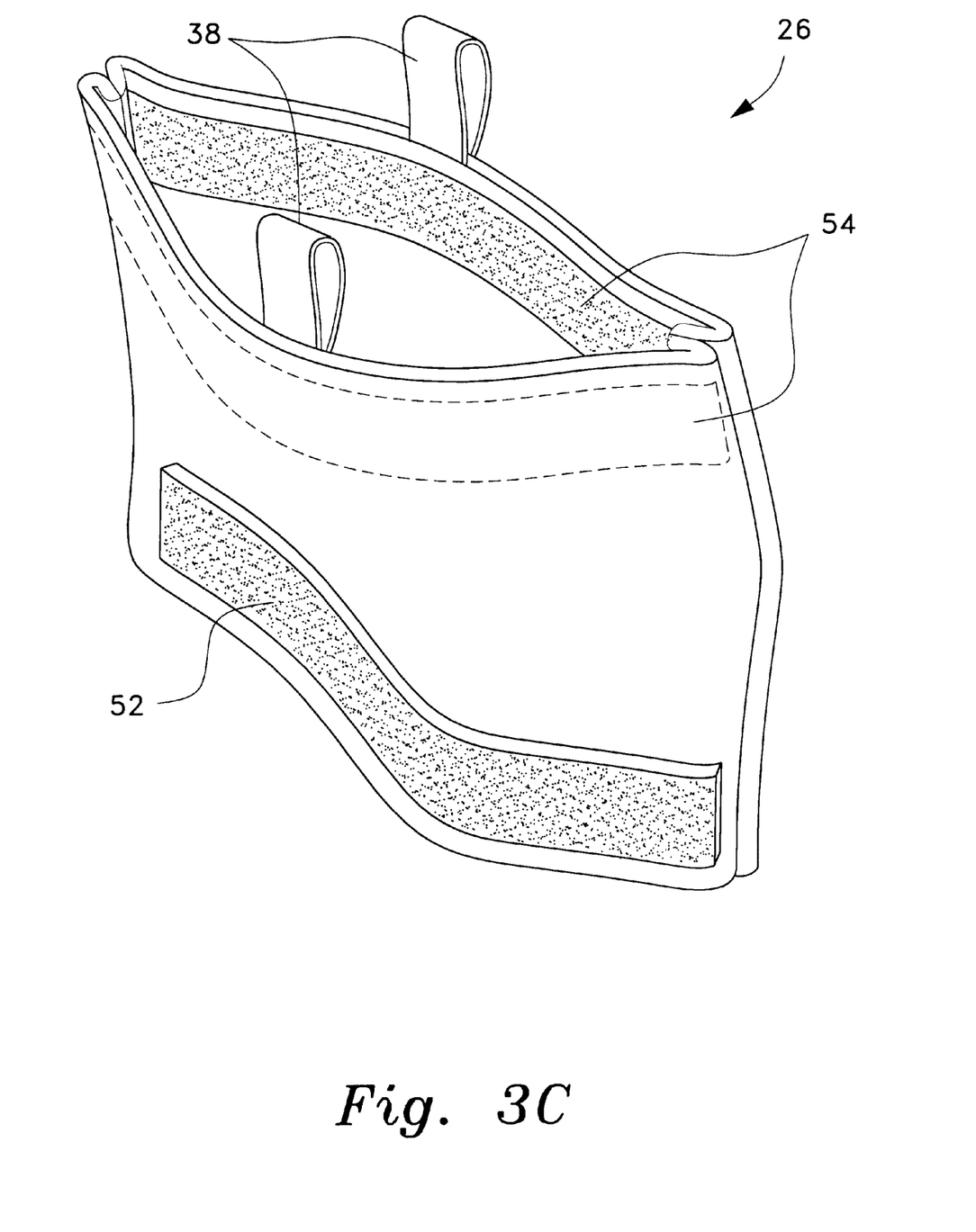
FIG. 3C shows a perspective view of a single-pocket insert for the portable case of FIG. 1.

FIGS. 3A, 3B and 3C show a view of the interior of the 3-panel case 100 with only the external pouch 30 attached (no inserts attached) as seen with the case 100 unfolded, a front view of the external pouch 30 detached from the case 100, and a perspective view of the single-pocket insert pouch 26, respectively.

In FIG. 3A, three hook-fastener strips, 92, 94 and 96, are used for fastening the various inserts in place. An additional hook-fastener strip 20 is used to close the flap 12 by attaching to a corresponding loop-fastener strip (not shown) on the outside of panel 14 along its free edge.

The external pouch 30, shown in FIG. 3B, is mounted onto the back of panel 16 of the case 100 by ribbons 32 and 34. The external pouch 30 contains a pocket that is closed using paired strips of hook-and-loop fastener material lining the sides of its opening. Grip ribbons 98 permit the user to open the external pouch 30 to place objects inside.

The insert pouch 26 shown in FIG. 3C is similarly opened and closed using paired strips of hook-and-loop fastener material 54 lining the sides of its opening. Grip ribbons 38 are used to open the insert pouch 26. A strip of loop fastener material 52 is provided along the lower outside margin of the insert pouch 26 for attachment to a corresponding hook fastener material 96 inside the case 100.

Figure 4A:
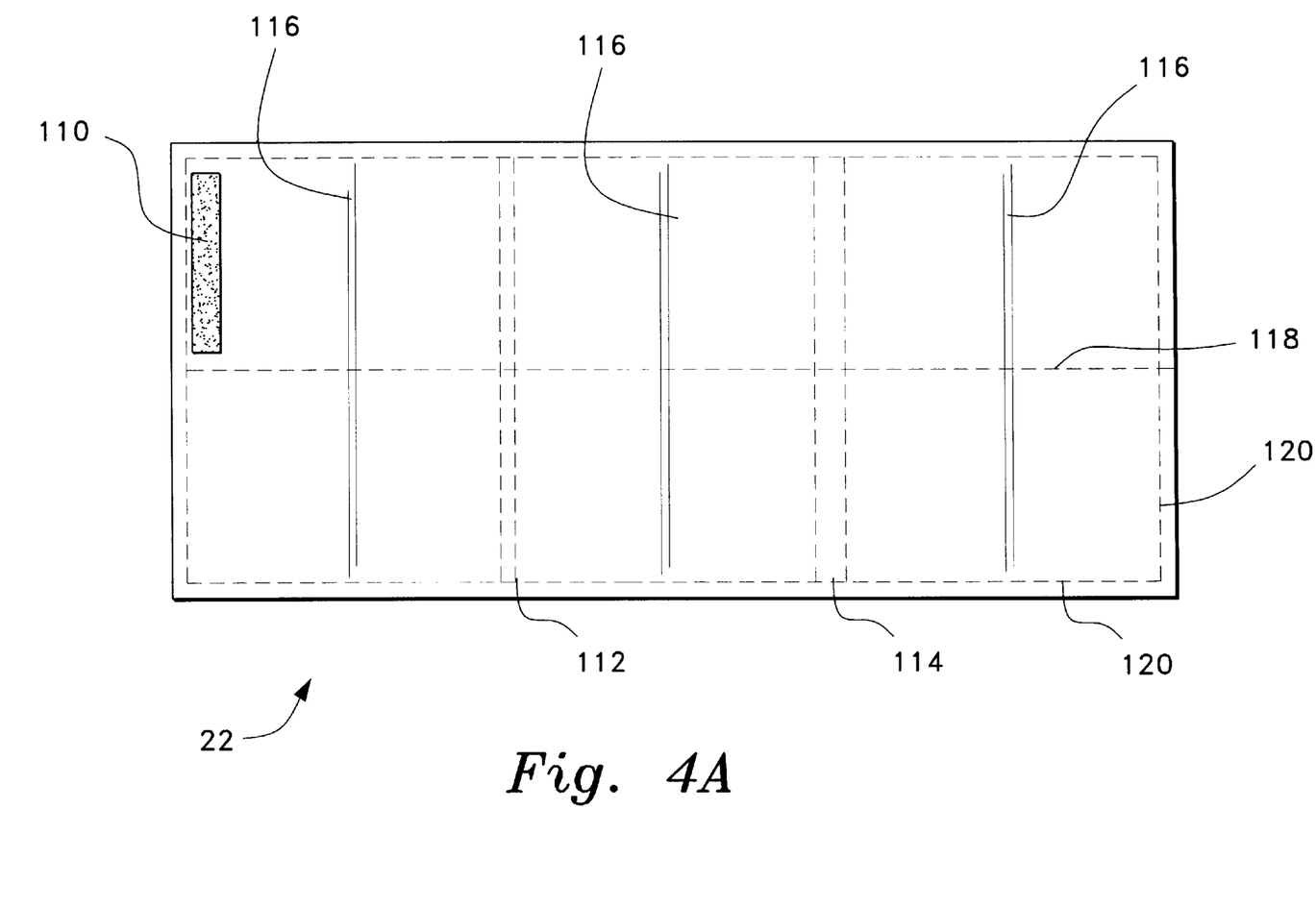
FIGS. 4A, 4B, and 4C show a multi-pocket insert in various stages of formation.
Figure 4B:
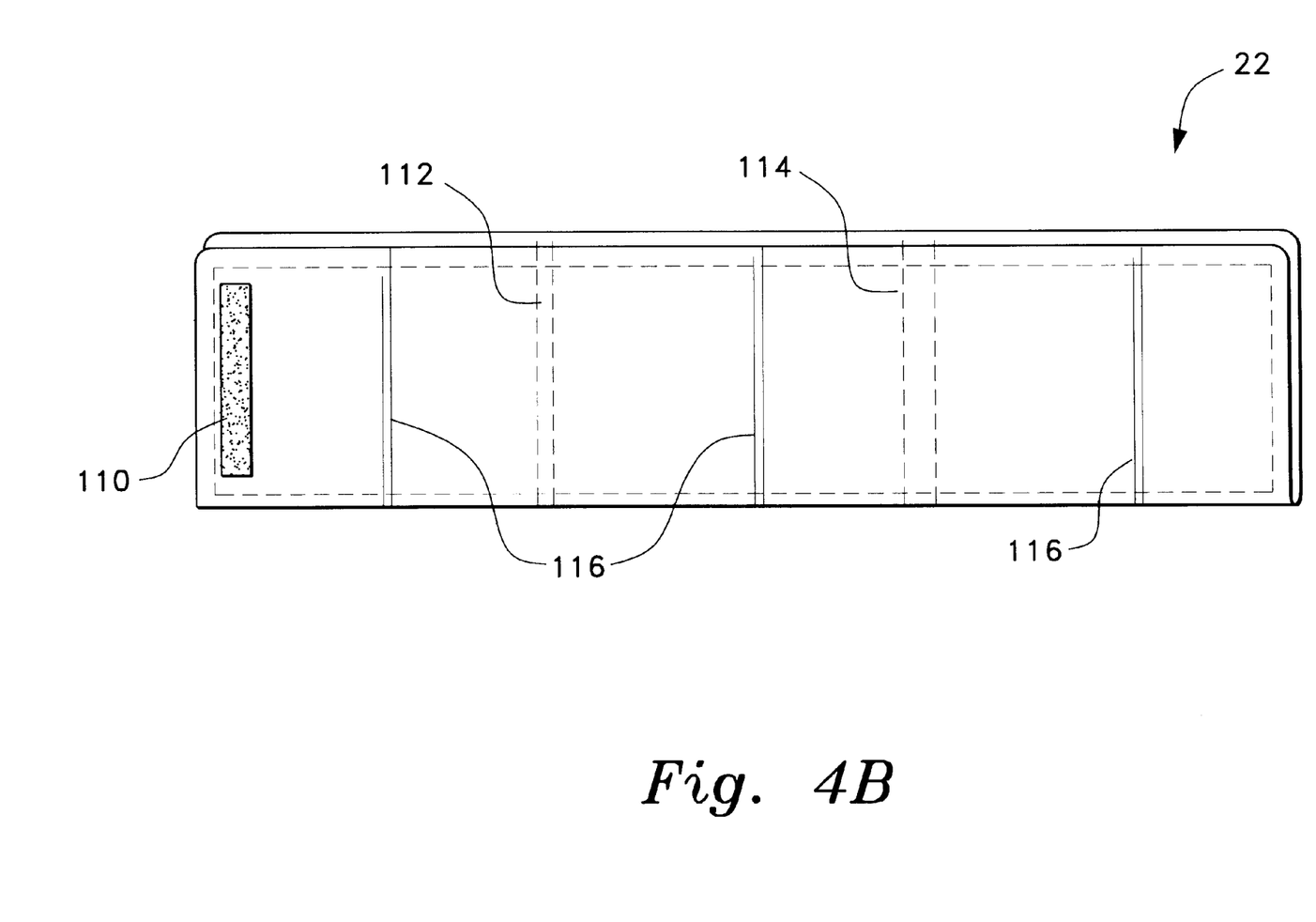
Figure 4C:
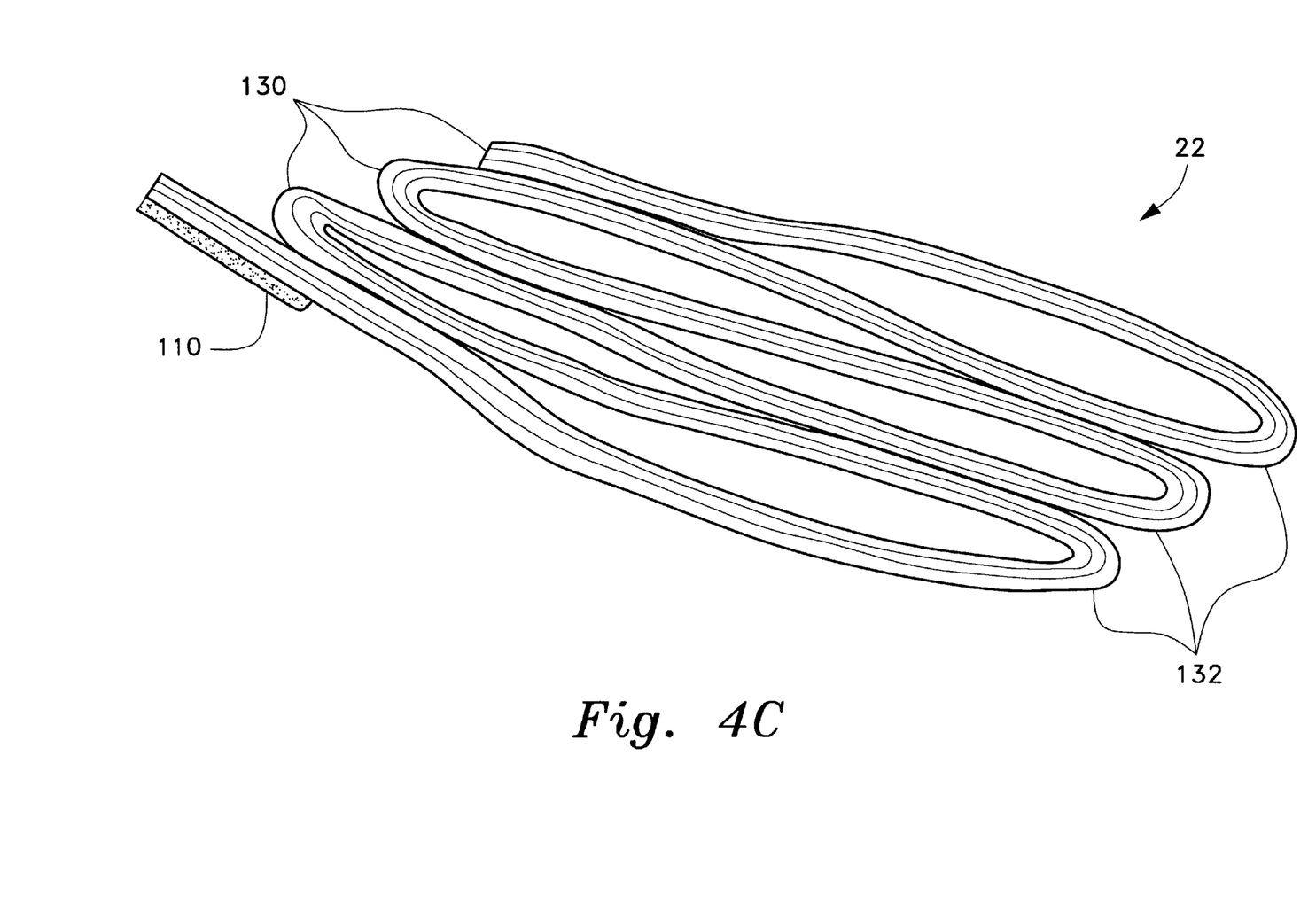

The case 100 also provides for an inventive multi-pocket pouch 22 that is constructed from a single sheet of textile material as shown in FIGS. 4A–4C. The multi-pocket pouch 22 is structured to be stitched in a particular manner to obtain a staggered layering of pockets. Initially, the multi-pocket pouch 22 is an elongated sheet of fabric having a strip of loop-type fastener material 110 attached near a corner. The sheet is first folded longitudinally along fold-line 118 and stitched together along the bottom and side edges of its perimeter 120 to form the structure shown in FIG. 4B. The structure of FIG. 4B is then folded in alternative directions, with either a single row, or a very closely parallel pair of rows, of stitches at 116 to define the bottom of the three pockets, and two parallel, spaced apart pairs of rows of stitches at 112 and 114, with the pair of rows at 114 being spaced apart wider than the pair of rows at 112, in order to obtain the structure of overlapping pockets shown in plan view in FIG. 4C, in which the strip of loop fastener material 110 ultimately appears on the outer surface of edge 130 that protrudes the farthest, edges 132 being opposite fastener strip 110. Fastener strip 110 may be attached either to upper hook fastener strip 92, or to medial hook fastener strip 94, as desired, with the pockets opening laterally. Removable pocket insert 24 is prepared in the same manner as pocket insert 22.

Details of the second embodiment of the carrying case 200 are shown in FIGS. 5A–5B and 6A–6E. In this embodiment, the case 200 includes permanently attached carrying handles 82 and 84 and five hook-type fastener strips, e.g., 204 and 206, to which the inserts can be detachably fastened. Insert pouches 42, 44 and 46, can be single or multi-pocket pouches constructed in the same fashion as pocket inserts 22 and 24, or single-layer two-sided sheets, each attached using a corresponding loop-type fastener strip. Panel 214 includes a permanently attached mesh layer 80 for attaching elongated objects.

Dual-pocket insert pouch 70 is also attached to the strip of hook-type fastener material inside panel 214. Grip ribbons 72 and 74 permit the user to open either end of the dual pocket insert to place objects inside. Pouch 70 is formed from a single piece of square fabric by folding the sheet in half and stitching the elongated edges together to form a sleeve. A strip of hook and loop fastening material is connected to the sleeve by a double row of stitches 76 and 78 (seen in FIG. 2) extending transversely across the middle of the sleeve to define two pockets, which open in opposite directions. The strip of hook and loop fastening material on the sleeve is used to removably attach the dual-pocket insert pouch 70 to a mating strip of hook and loop fastening material on the inside surface of panel 214.

Figure 5A:
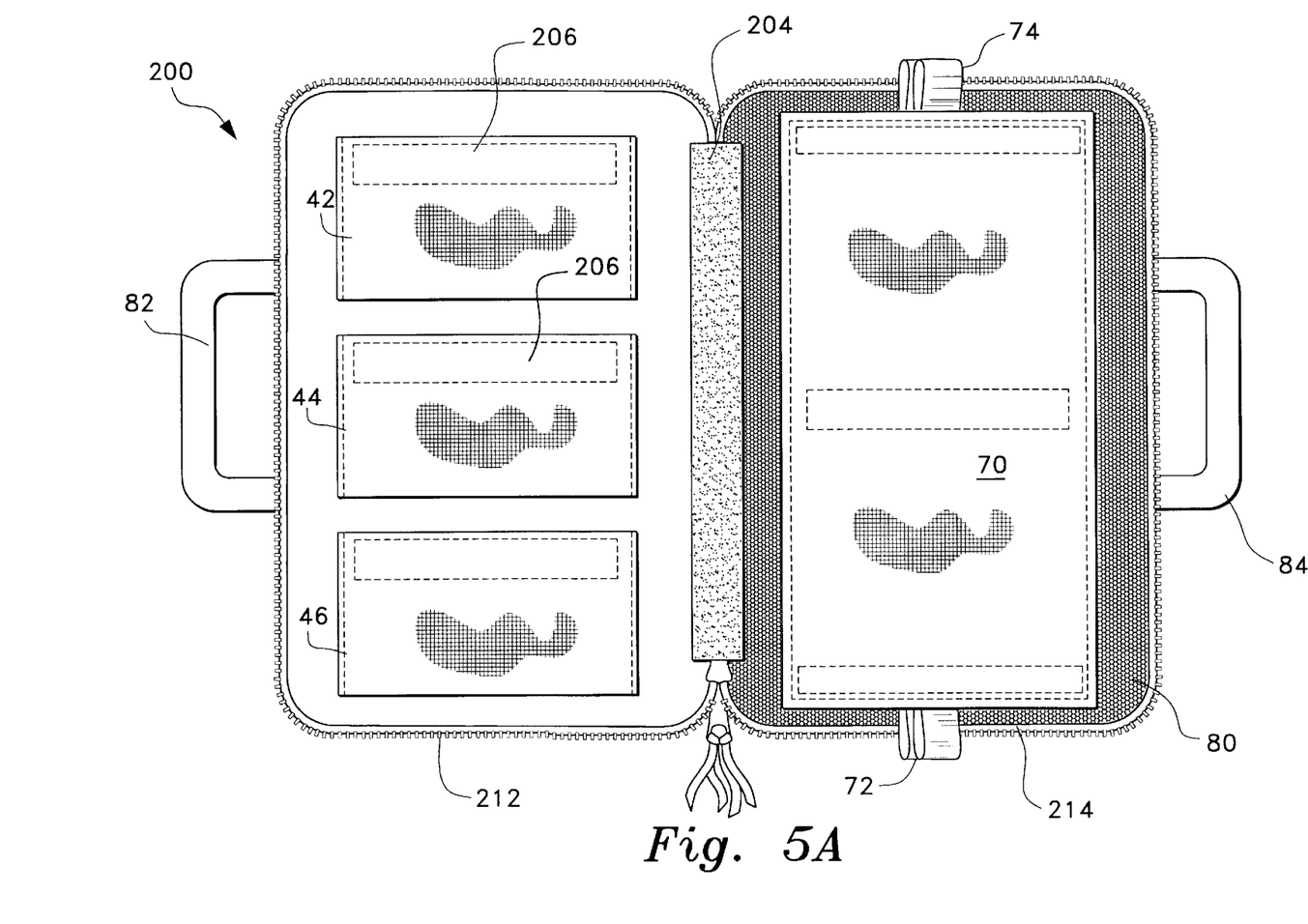
FIGS. 5A and 5B show the interior including inserts for the embodiment of FIG. 2.
Figure 5B:
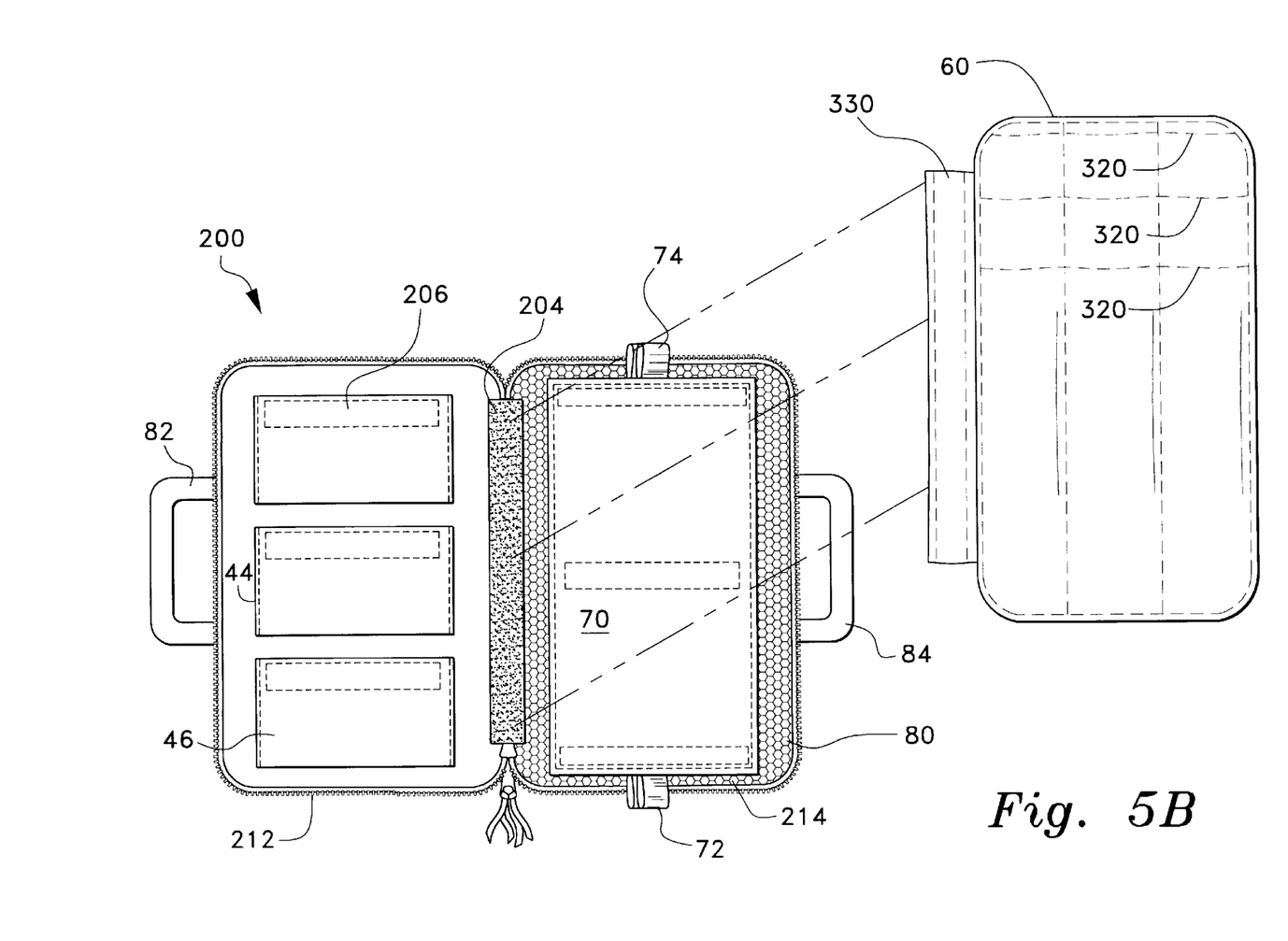
Figure 6A:
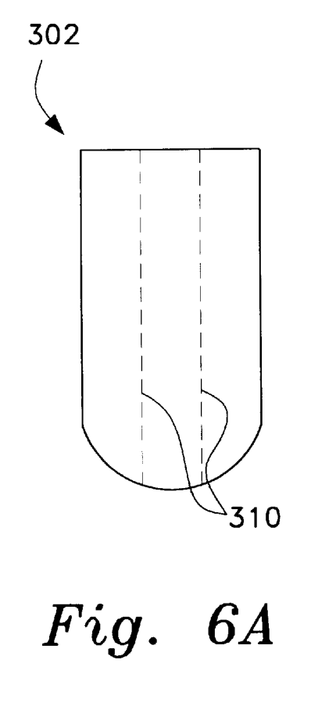
FIGS. 6A, 6B, 6C, 6D and 6E show various pieces that are assembled to form the elongated multi-pocket pouch insert for use in the embodiment of FIG. 2.
Figure 6B:
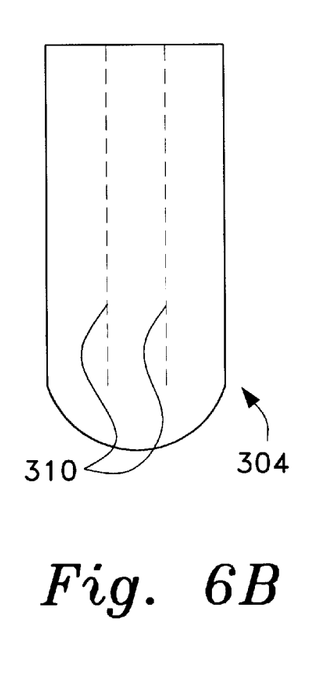
Figure 6C:
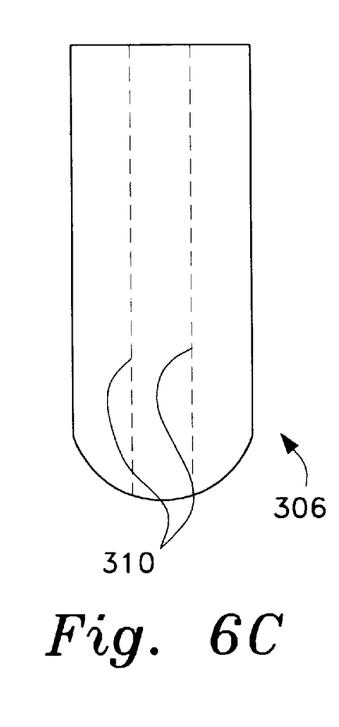
Figure 6D:
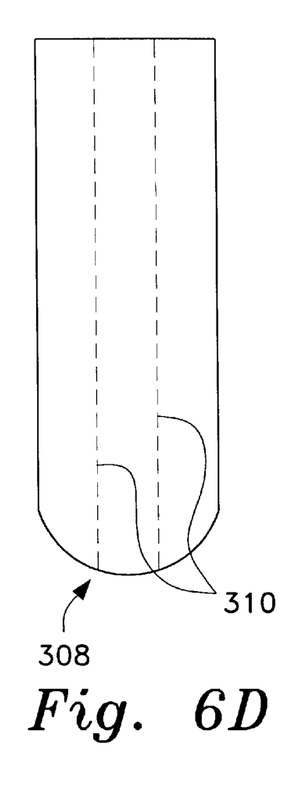
Figure 6E:
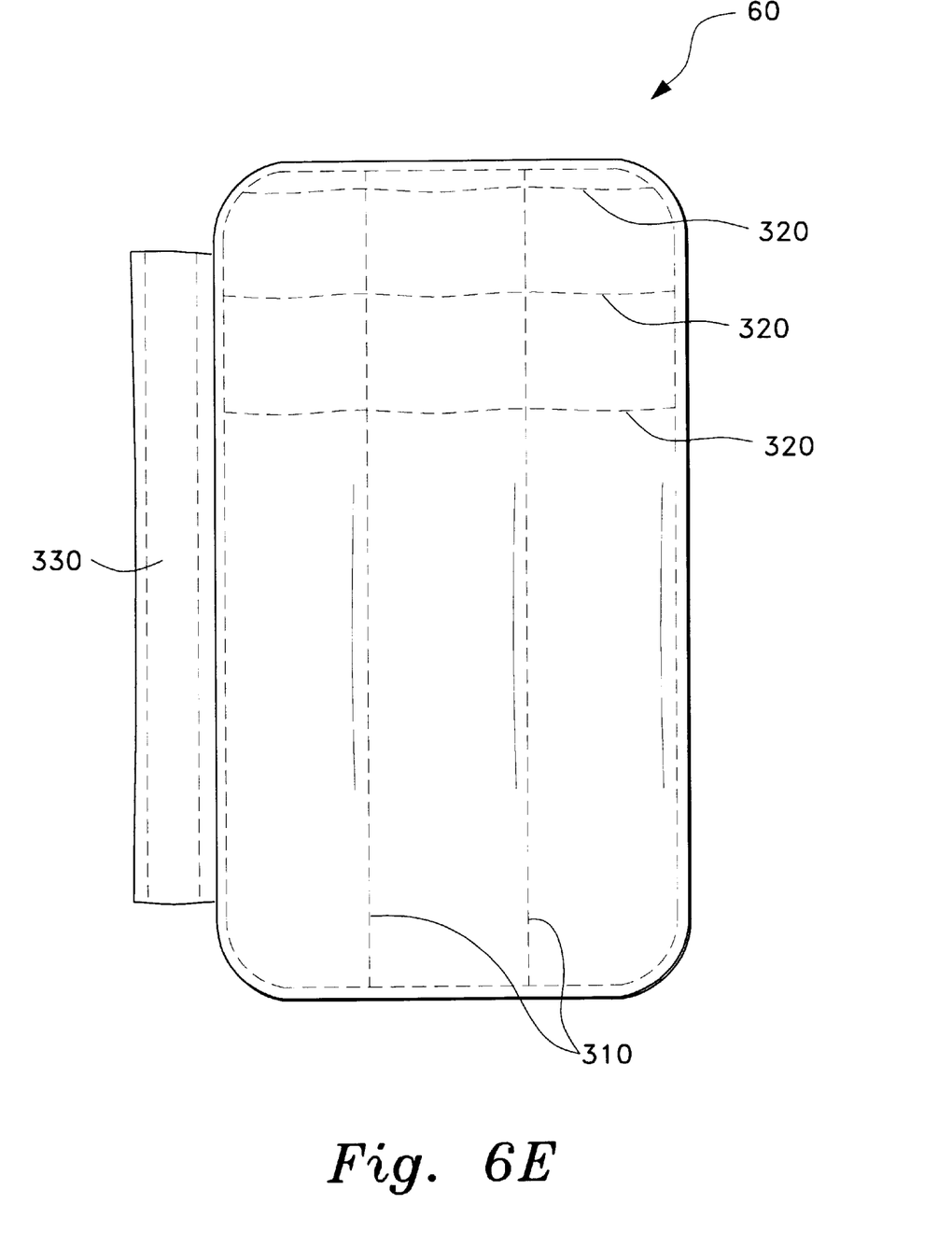

Finally, elongated multi-pocket pouch insert 60 is usable in the carrying case of the second embodiment. The construction of this pouch insert is shown in FIGS. 6A–6E. Layers 302, 304, 306 and 308 are stacked from top to bottom in size order with the shortest on top and longest in the bottom, stitched together along three sides, and then stitched together along the longitudinal stitch lines 310. The final structure is shown in FIG. 6E showing the tops of the pockets along edges 320. Elongated objects such as knitting needles can be inserted in these pockets. Also, a strip of material 330 including one side (on the rear) having a loop-type fastening material is attached to bottom layer 308 to permit the multi-pocket pouch 60 to be detachably fastened to the center strip of hook-type material 204, as shown in FIG. 5B. The rear surface of layer 308 may have a fleece backing similar to that of single-ply insert 28 for securing objects which may be hooked into the fleece.

The material used to form the cases 100 and 200 can be any available textile material, such as cloth or drapery material. Also, the hook-type fastening strips and the corresponding loop-type fastening strips described above can be switched provided that all strips inside the case for attaching the inserts are the same and all strips on the surfaces of the inserts are the same and can be fastened to the corresponding strips inside the case.

It is to be understood that the present invention is not limited to the embodiments described above, but encompasses any and all embodiments within the scope of the following claims.

We claim:

1. A portable carrying case for carrying a plurality of elongated and small objects, comprising:

a first panel, a second panel and a spine having opposite edges, the first and second panels being pivotally attached to the opposite edges of the spine, the two panels being pivotal into parallel relation, each of said panels having an inner surface and an outer surface;

a first strip of hook-and-loop fastening material attached to the inner surface of said first panel;

at least a first detachable insert having a second strip of hook-and-loop fastening material capable of mating with said first strip for removably attaching said first detachable insert to the case;

a mesh layer lining permanently disposed on the inner surface of said second panel for removably retaining an elongated object;

a third strip of hook-and-loop fastening material attached to the mesh layer lining, said mesh layer being disposed between said second panel and said third strip; and, at least a second detachable insert having a fourth strip of hook-and-loop fastening material capable of mating with said third strip for removably attaching said second detachable insert to the case.

2. The portable carrying case according to claim 1, further comprising closure means for securing the case in a closed position in which said first and second panels are in substantially parallel relation.

3. The portable carrying case according to claim 2, wherein said closure means comprises:

a flap pivotally attached to said first panel; and a fifth strip of hook and loop fastening material attached to said flap, the fourth strip being adapted for removable attachment to a mating sixth strip of hook and loop material attached to the outer surface of said second panel.

4. The portable carrying case according to claim 2, wherein said closure means comprises a zipper extending between said first and second panels.

5. The portable carrying case of claim 1, wherein said at least one detachable insert is selected from the group consisting of a single-ply sheet having a fleece backing, a single pocket pouch, a dual pocket pouch, and a multi-pocket pouch.

6. The portable carrying case of claim 1, where said at least one detachable insert comprises a plurality of detachable inserts.

7. The portable carrying case of claim 1, further comprising:

an external pouch;

a pair of ribbons sewn to said external pouch and forming a loop around said first panel, said external pouch in abutting contact with the outer surface of said first panel.

* * * * *